(12) United States Patent
Francois et al.

(10) Patent No.: US 8,659,447 B2
(45) Date of Patent: Feb. 25, 2014

(54) SYSTEM FOR SCHEDULING TASKS TO CONTROL THE EXECUTION OF WARNING PROCEDURES ON AN AIRCRAFT

(75) Inventors: Gilles Francois, Toulouse (FR); Fabien Guilley, Merenvielle (FR); Nicolas Marty, Saint Sauveur (FR); Julia Percier, Saint Sauveur (FR)

(73) Assignee: Thales, Neuilly sur Seine (FR)

( * ) Notice: Subject to any disclaimer, the term of this patent is extended or adjusted under 35 U.S.C. 154(b) by 828 days.

(21) Appl. No.: 12/553,289

(22) Filed: Sep. 3, 2009

(65) Prior Publication Data

US 2010/0066565 A1    Mar. 18, 2010

(30) Foreign Application Priority Data

Sep. 5, 2008 (FR) ...................................... 08 04879

(51) Int. Cl.
*G08B 23/00* (2006.01)
(52) U.S. Cl.
USPC ............................................ 340/963; 340/945
(58) Field of Classification Search
USPC .......... 340/963, 945, 961; 395/185.01, 1, 18, 395/184.01; 455/431
See application file for complete search history.

(56) References Cited

U.S. PATENT DOCUMENTS

| | | | |
|---|---|---|---|
| 6,021,262 A * | 2/2000 | Cote et al. ........................ | 714/48 |
| 2005/0216504 A1 * | 9/2005 | Delvat et al. ............... | 707/103 R |
| 2005/0233739 A1 * | 10/2005 | Forbes et al. .................. | 455/431 |
| 2006/0238511 A1 * | 10/2006 | Gyde et al. .................... | 345/168 |

FOREIGN PATENT DOCUMENTS

| | | | |
|---|---|---|---|
| EP | 0 647 903 A1 | 4/1995 | |
| EP | 0 838 757 A1 | 4/1998 | |

* cited by examiner

*Primary Examiner* — Shirley Lu
(74) *Attorney, Agent, or Firm* — Baker & Hostetler LLP

(57) ABSTRACT

The invention relates to onboard failure warning management systems on aircraft, or flight warning systems (FWS). Traditionally, the logic of these systems refers to procedures to be executed by the crew in response to warnings. Modifications, however minor, to the procedures involve a new development that can be installed on the airplane computer only as part of a costly maintenance procedure, given notably the need to carry out exhaustive tests on the application. The invention introduces the concept of tasks defined by a set of variables, notably the warning and the procedure in which the task is executed, its category, its priority level and its status. Thus, the computer programs can be organized in modules that call the tasks to be executed, the parameters of said tasks being defined in a configuration table that can be updated as the procedures change during simple operation maintenance procedures.

13 Claims, 4 Drawing Sheets

| ON GND ENG 1 FIRE OR SEVERE DAMAGE |
|---|
| P L 1 + 2 . . . . . . . G I / REVERSE AS RQD<br> WHEN A/C STOPPED.<br>PARKING BRAKE . . . . . . . . . . . . . . . . . ENGAGE<br>C L 1 + 2 . . . . . . . . . . FTR THEN FUEL S O<br>FIRE HANDLE 1 . . . . . . . . . . . . . . . . . . . . PULL<br>FIRST AGENT 1 . . . . . . . . . . . . . . . . . . . DISCH<br>☐ IF FIRE AFTER FURTHER 30 SEC<br>SECOND AGENT SIDE 1 . . . . . . DISCH<br>■ IF EVACUATION RQD<br>OR<br>■ IF EVACUATION NOT RQD |
| ELEC SMK |

SYSTEM FOR SCHEDULING TASKS TO CONTROL THE EXECUTION OF WARNING PROCEDURES ON AN AIRCRAFT

CROSS-REFERENCE TO RELATED APPLICATIONS

This application claims priority of French application no. FR 0804879, filed Sep. 5, 2008, the disclosure of which is hereby incorporated by reference in its entirety.

FIELD OF THE INVENTION

The present invention belongs to the field of onboard flight management systems on aircraft. More specifically, it applies to the onboard warning management system which monitors the communication to the crew of warnings issued by a subsystem that has detected a failure or a risk and lists the procedures to be applied by said crew in response to said warnings.

BACKGROUND PRIOR ART

A centralized flight warning system (FWS) represents an advance compared to warning reports by subsystem that did not provide the crew with an overview in the event of the concomitant occurrence of a number of warnings. On the other hand, the development and maintenance of such systems are complex and costly because they depend not only on the technical specifications of the aircraft equipment but even more on the operational procedures of the airlines. It is therefore important to be able to easily modify the configuration of a warning management system on the one hand, for one and the same airplane model, according to the order from the airline that operates it, and on the other hand, for one and the same airline, over time, according to the changing regulations and feedback from the users. These conditions are not fulfilled by the warning management systems of the prior art which have the characteristic of being developed, given the certification constraints, as a monolithic sequential code.

SUMMARY OF THE INVENTION

To resolve this problem, the general idea behind the invention is to structure the software that implements the FWS functions in the manner of a task sequencer that has a common system core for one and the same airplane model and of which different modules can easily be replaced to be adapted to an airline's configuration.

To this end, the invention discloses a system for managing warnings onboard an aircraft comprising an airplane data acquisition module, a failure detection module, a warning module signaling said failures and a user interface module, said system further comprising a module for scheduling tasks to be executed for at least one warning and at least one procedure to be executed for said warning, said scheduling being parameterizable using a configuration table that can be modified by an operation maintenance procedure.

Advantageously, the configuration table comprises at least, for each of the tasks, the indication of the warning and of the procedure that define it and at least one parameter for scheduling said task.

Advantageously, one of the parameters for scheduling a task is an order of display priority on the user interface module.

Advantageously, each task has an associated status variable, said variable being loggable in a parameterizable way.

Advantageously, the warning management system according to the invention also comprises a module for converting XML files to generate the configuration table.

The invention also relates to a method of managing warnings onboard an aircraft comprising an airplane data acquisition step, a failure detection step, a step of warning about said failures and a user interface step, said method further comprising a step for scheduling tasks to be executed for at least one warning and at least one procedure to be executed for said warning, said scheduling being parameterizable using a configuration table that can be modified by an operation maintenance procedure.

Advantageously, the scheduling step comprises a first substep for defining the order of priority of execution of the tasks and a second substep for modifying the status of the tasks based on the outputs from the airplane data acquisition step and the user interface step.

Furthermore, the invention relates to a method of developing and maintaining the system for managing warnings onboard an aircraft, comprising at least one step for defining a list of tasks to be executed characterized by variables selected from the group (warning, procedure, category, priority, status) and a step for programming in high-level language at least a portion of the runtime logic of said tasks.

Advantageously, the inventive development and maintenance method further comprises a step for converting the program in high-level language into effective language and a step for loading at least a portion of the output from the conversion step in a configuration table of said system onboard the aircraft.

Advantageously, the loading step is performed at the time of an aircraft operation maintenance procedure.

The invention provides the additional advantage that the checks, in particular the crew acknowledgements, that are conventionally programmed in the part of the human/machine interface dedicated to warnings in the systems of the prior art, are, in the inventive system, performed in the sequencer itself which makes it possible to meet the client companies' specifications without modifying the programming of the human/machine interface. Furthermore, the task sequencer can retain in memory the successive states of the different parameters of the system, which makes it possible to improve the traceability of the various actions carried out during a warning. Furthermore, the priority management at task level makes it possible to manage priority conflicts at different levels of the procedures applicable to a number of simultaneously current warnings. Also, the development and maintenance times are greatly reduced by the factorizing of the developments that results from the breakdown into tasks.

BRIEF DESCRIPTION OF THE DRAWINGS

The invention will be better understood, and its various characteristics and benefits will emerge from the following description of a number of exemplary embodiments and its appended figures, in which:

FIG. 4 illustrates the operation of the warning management method onboard an aircraft according to the invention in an exemplary warning scenario.

DETAILED DESCRIPTION

Unless otherwise stated, in the description and the figures, the symbols, acronyms and abbreviations have the meanings indicated in the table below.

| Symbol/abbreviation | Meaning |
| --- | --- |
| A/C | Aircraft |
| AFDX | Avionics Full DupleX switched Ethernet |
| AMS | Avionics Management System |
| ARINC | Aeronautical Radio, Inc. |
| BITE | Built-In Test Equipment |
| C/W | Caution and Warning system |
| CAS | Crew Alert System |
| CKL | Check List |
| CDS | Cockpit Display System |
| CMF/CMS | Communication Management Function/System |
| CSCI | Computer Software Configuration Item |
| DCA | Data concentration application |
| DFFWS | Definition file of FWS |
| ECAM | Electronic Centralized Aircraft Monitor |
| ECP | ECAM Control Panel |
| EWD | Emergency Warning Display |
| FWA | Flight Warning application |
| FWS | Flight Warning System |
| HMI/IHM | Human Machine Interface |
| IMA | Integrated Modular Avionics |
| MWC | Master Warning Caution |
| NVM | Non Volatile Memory |
| INOP SYS | Inoperative system |
| SWAP | Severe Weather Avoidance Procedure |
| T2CAS | Terrain and Traffic Collision Avoidance System |
| TFTP | Trivial File Transfer Protocol |
| WXR | Weather Radar system |
| XML | eXtensible Mark-up Language |

Figure 1:
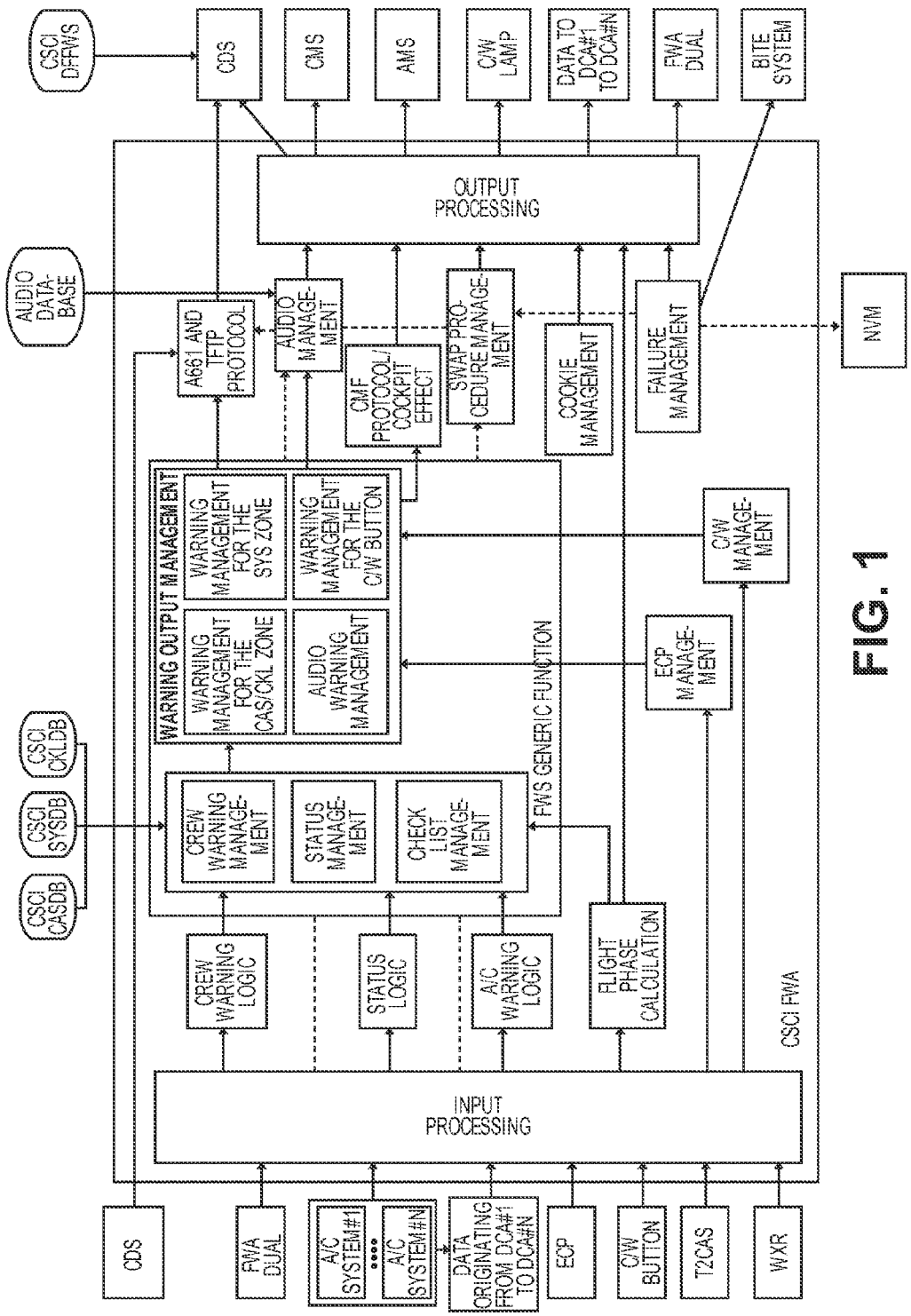
FIG. 1 represents the relationships of a warning management system with the other onboard systems.

FIG. 1 represents the relationships of a warning management system with the other onboard systems.

The FWS system is implemented redundantly on two computers of the IMA (integrated modular avionics, able to be implemented on a Power PC computer) architecture, in which the consistency of the output is checked at each computation step. Each computer FWS/FWA therefore has for input those from the dual computer in the corresponding step and also sends it its own results. Furthermore, the FWS receives as input the A/C data (i.e.: the discretes from the onboard computers used to detect the failures of an electronic equipment connected thereto) and the DCA data on n channels (making it possible to correlate the failures with each other). Finally, four systems advantageously send their output to the FWS computer:

- the output from the control panel of the centralized Monitor subsystem of the airplane electronics (ECP/ECAM) which return the pilot actions (item acknowledgement, movement in the check list, access to system pages and to procedure lists);
- the states of the notification and warning C/W button at the output of the FWS system;
- the output from the terrain and aircraft avoidance system T2CAS; this system manages the positioning of the aircraft relative to the relief and relative to the trajectories of other detected aircraft and sends warnings to the FWS system in case of a collision trajectory;
- the output from the meteorological radar WXR system; these output are used to trigger warnings on severe bad weather.

These data are conditioned for use by the FWS system ("input processing" function). Crew warning, status management and A/C warning logics are implemented to process the input data, the processed data being supplied to the FWS generic function core. The crew warning logics are dedicated to the triggering of current warnings specific to a given item of equipment. When producing a check list (triggered by the first type of logic), the status logic induces a status check list. The A/C warning logics are identical to the first type of logic, but are generic to a set of computers and not to a single computer. The parameters of the current flight phase are also supplied to the FWS core.

The FWS core is advantageously partitioned into three management functions (crew warnings, states and check list) and four output warning management functions (CAS/CKL zone managing warnings that have been triggered and that induce a check list procedure, INOP SYS managing the warnings that are triggered and filtered and do not induce either a warning or a procedure—only the INOP SYS indicator will be seen by the crew, audio warnings, C/W button warnings). The audio warnings are selected from an audio message database provided for this purpose. The visual warnings are displayed on the screens provided for this purpose in the cockpit and the flight deck. The Arinc 661 and TFTP protocols make it possible to communicate with the CDS (cockpit display system). The CMF protocol makes it possible to send failure data to the centralized maintenance system, to trace all the anomalies detected during the flight; management of severe weather avoidance procedures (SWAPs): a tool to help in implementing procedures specific to North American airspace decreed by the FAA and triggered by air traffic control if there is a need for rerouting, notably in cases of severe storms or cyclones.

Figure 2:
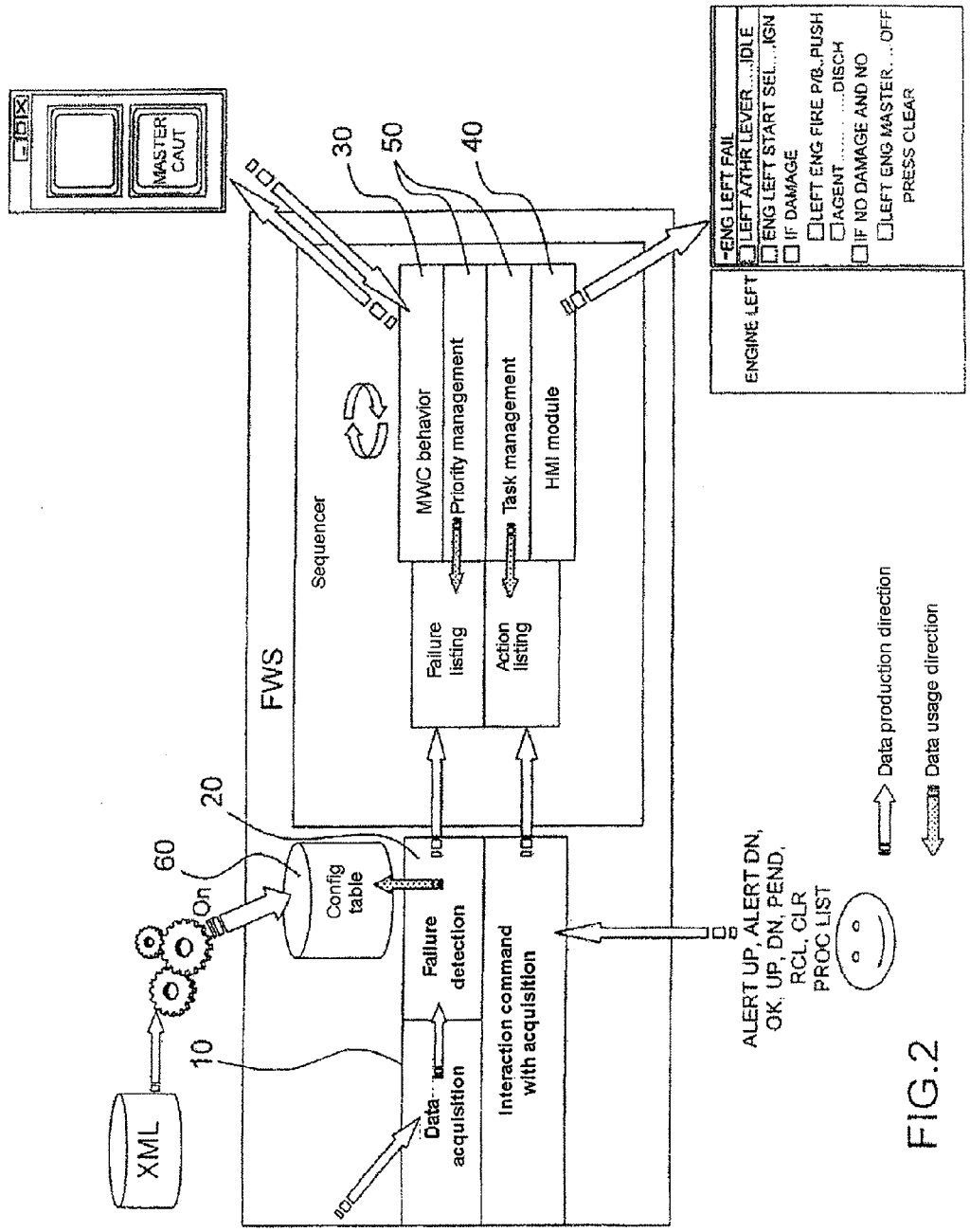
FIG. 2 represents the simplified functional architecture of a warning management system according to the invention.

FIG. 2 represents the simplified functional architecture of a warning management system according to the invention. A data acquisition module 10 groups together the parameters needed to evaluate the operation of the supervised systems. It can concern intrinsic data (malfunction of an item of electronic equipment or an engine, cabin pressure, altitude, speed, etc.) or extrinsic data (output from the collision avoidance system, output from the weather system, message from the airline, control message, etc.). It is also possible to envisage the data acquisition module acquiring the data modified by the crew in response to a warning and so enabling the execution of a procedure to be validated in closed loop mode. A failure detection module 20 analyzes these supervised data to deduce therefrom the detection of failures that are stored in a failure listing. The commands executed by the crew generate an action listing. The failures stored in the failure listing trigger, where appropriate, a master warning, master caution (MWC) action 30, generally in the form of a visual signal from the corresponding button, possibly accompanied by an audio message, all under the control of the MWC module's behavior logic. The actions to be carried out by the crew are displayed via the human/machine interface (HMI) module 40 in the form of procedures listed in pages. A standard procedure is to require the crew to acknowledge the consultation of the pages listing the procedures to be carried out in the case of a current warning. The actual sequencing is handled by the priority management and task management functions combined in the task scheduling module 50. This scheduling module comprises the software components used to trigger the warnings specific to each failure and provide the users with the associated procedures according to criteria defined in the different versions of the FWS system. As detailed hereinbelow, a task is a warning/procedure pairing which also comprises other attributes. The "Task" object is used to handle the scheduling at a more detailed level than that of the procedure, which is the level of scheduling of the FWS systems of the prior art. The parameters for scheduling the FWS system warning processing tasks that are specific to given operating conditions of an aircraft are loaded into a configuration table 60 and used by the failure detection module (display style, text of the procedure items, structure of the procedures, links between procedures, unique task identifier). All the static data known a priori are in the configuration table; all the data describing the system's execution dynamics are not described in the configuration table, but are part of a meta-model described in the commentary to FIG. 4. From the input data of the module 10, the failure detection module 20 applies the logics used to determine the task identifiers. The configuration table can easily be updated in an operator maintenance operation or during a simple stopover, by downloading from a database qualified as DO200. The loading is performed simply with no need for program recompilation, the prior parameters being simply overwritten by the new parameters by ground/onboard file exchange by FTP or TFTP protocol during centralized maintenance operations. The data to be loaded are generated by an XML module.

The scheduling module includes a generic data model that is not modified in the various instantiations of an FWS system developed for an aircraft that has a given hardware and software configuration. The model is made up of tasks to be carried out by the system according to prescribed behaviors or rules. The behaviors or rules are used to process the connections from (failure characteristic data) and to (generation of warnings and application of corresponding procedures) outside the system. These behaviors can change from one version to another. They are stored in the system's configuration table. The rules are applied directly to the tasks, on the one hand to implement the management logic for the priorities defined in the system (priority management function), on the other hand to take into account the actions of the user on the data model (task management function). The priority management logic can be defined for example at three levels, plus a conflict resolution rule in cases of equal priority, for example the order of arrival. The scheduling module or the sequencer of the FWS receives triggers and applies behaviors that are used to process the system tasks. For each type of failure, the "failure detection" module checks whether the failure triggering conditions are fulfilled and updates the failure listing accordingly. The "priority management" module activates or deactivates the tasks according to the updates to the failure listing. The "interaction command with acquisition" module updates the action listing as soon as the user performs an action on the ECP. The "task management" module uses this action listing to change, for example, the internal states of the current task (change page, validate an item, etc.), or to change the current task.

The sequencer also manages transmittals to the notification/warning system (C/W) and the updates to the user interface (HMI). The display of the warning information on the user interface (EWD or emergency warning display) is standardized (ARINC 661 standard). It comprises a control panel for the elements of the CAS (crew alert system) and a control panel for the procedures corresponding to these CAS.

The tasks can be subdivided into subtasks. To perform multiple-choice procedures, each choice is represented by a subtask having the same priority as the task from which it derives.

The sequencer displays the tasks to the user in the order in which they must be executed, given the priority levels defined or resulting from the order of arrival. A sequencer control process rotates with a determined frequency of the order of 50 ms. The dimensioning of the system depends notably on the power of the computer and the responsiveness of the bus. The sequencer control process modifies the internal status of the tasks of the model based on user input and aircraft data.

Figure 3:
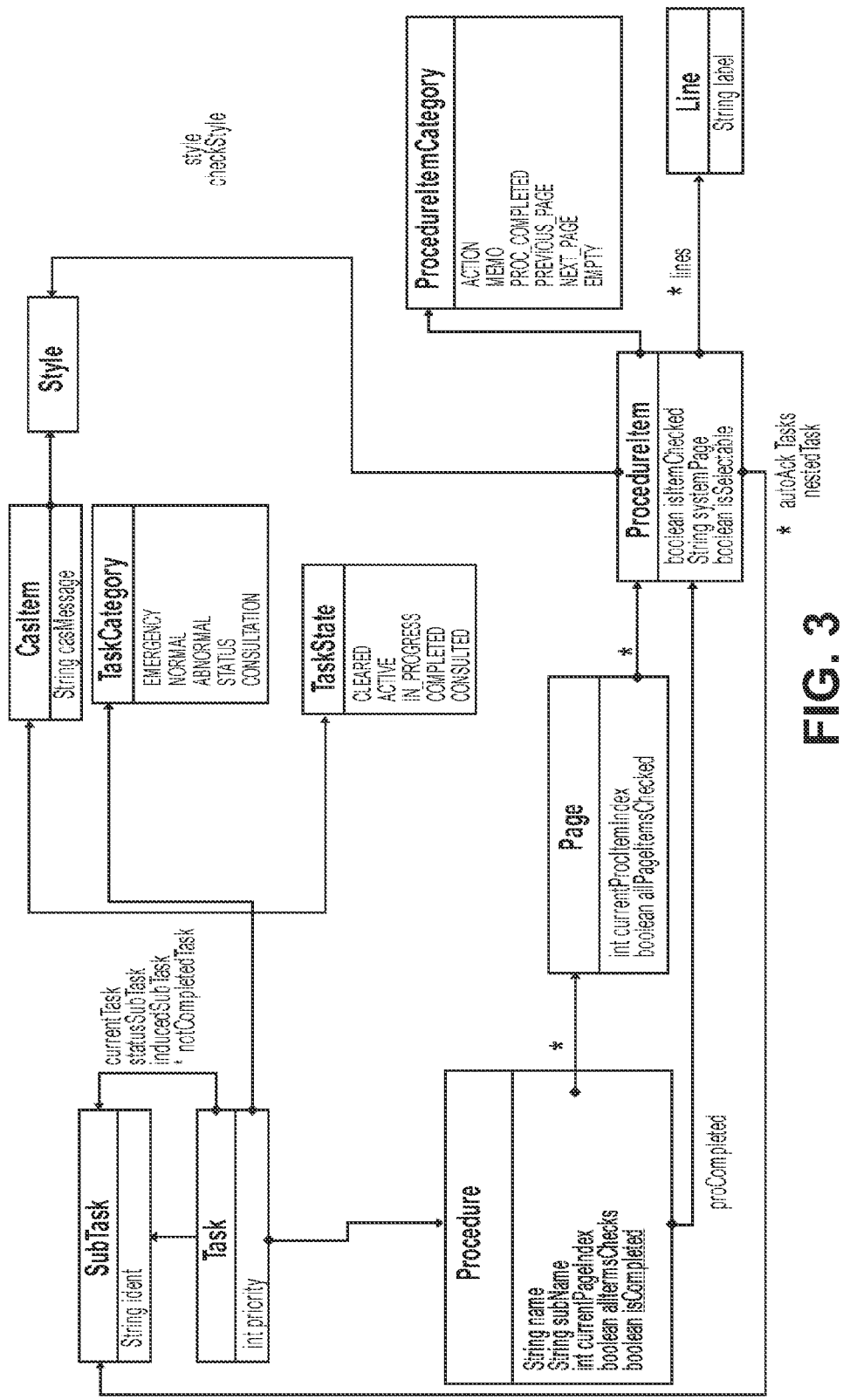
FIG. 3 represents the operating logic at the level of a task according to one embodiment of the invention.

FIG. 3 represents the operating logic at the level of a task according to an embodiment of the invention.

The TaskCategory entity can take different values, for example:
EMERGENCY: Urgent task (linked to a priority failure placing the airplane in danger)
NORMAL: Normal task (linked to a routine check list corresponding to the pilot actions of a flight phase)
ABNORMAL: Abnormal task (linked to a non-priority failure not placing the airplane in danger but having to be dealt with)
STATUS: Status update task (linked to a summary of a completed abnormal task)
CONSULTATION: Consultation task (any EMERGENCY, NORMAL OR ABNORMAL task, in free consultation mode, that is to say, not triggered by the system)

The TaskState entity can, for example, take the following values:
CLEARED: Task active but hidden from the user at the request of the user
ACTIVE: Task active (failure triggered in the system)
IN_PROGRESS: Active task currently executing (presented to the user)
COMPLETED: Task completed
CONSULTED: Task consulted As already indicated, the tasks can comprise subtasks that have their own attributes, notably their status and their task dependency link.

Each task is linked to a warning (CASItem) identified by a message character string. The display of CASItem can be parameterized by a style sheet which can be selected with a default format or configured differently. The display of the data in the style sheet can be parameterized using an XML file.

Each task is also linked to a procedure (Procedure) identified by one or more character strings. Since the display of the procedures is paginated, each of the pages that displays a procedure is identified by an index (PageIndex). A number of status indicators can also be provided as attributes of a procedure, notably a status variable indicating whether all the items of the procedure have been checked (allitemsChecked) and whether the procedure has been completed (isCompleted). The checking of the procedure pages and, on each page, of each item, can also be followed by status variables. On each procedure page, each line (Line) can also be identified by a label. Each procedure item can be identified by a category to which it belongs (ProcedureItemCategory) which can, for example, take the following values:
ACTION: Action item that can be validated by the user
MEMO: Text item
PROC_COMPLETED: Item indicating that the procedure has been completed
PREVIOUS_PAGE: Action item used to access the previous page
NEXT_PAGE: Action item used to access the next page
EMPTY: Empty item The operation of the method of managing warnings onboard an aircraft is illustrated by the application to a warning case illustrated on the screen shot in FIG. 4. This example is by no means limiting on the possible embodiments of the invention:
On the left: ELEC SMK represents a warning (Cas Item) that has been detected.

On the right: the procedure corresponding to the warning on the left is presented to the pilot.

The first 2 lines represent a memo item (non-interaction information);

The third and fourth lines represent action items validated by the pilot;

The framed line represents the current item that can be validated;

The following lines represent the action items that have not yet been validated;

The lines with IF represent a multiple choice. The validation of one of these items will lead to the selection of the corresponding subtask.

The structuring of the FWS system according to the invention as has just been described makes it possible to organize the developments in such a way as to factorize a large portion of the software code lines. The portions that depend only on the hardware configuration of the external modules and on the software configuration common to a type of aircraft without depending on the variable specifications of the aircraft manufacturer, are implemented in the scheduling module. The portions that closely depend on the operational conditions of use specific to an operator, such as the assignment of priority levels to tasks, the content of the procedures, the display style sheet and the task and display execution logic, notably, are processed as parameters that are stored in a configuration table. These portions can be programmed using a high-level language, such as XML (eXtended Mark-up Language). A software development workbench can be used to manage this distribution of the processes and data. Certification can be obtained with an initial configuration. It will not be necessary to recertify the future changes to the FWS system with a modified configuration table, given that it can be proven that modifying the table in no way changes the behavior of the system. Such will be the case if the software development workbench is compatible with the DO200 standard.

To make a modification to the configuration table, all that is needed is to generate one or more XML files which will be converted by the development workbench into the structure of the configuration table. Two different types of XML files are generally used, a first type that describes the style sheet applicable to the data and a second type comprising the description of all the data needed for the processing of the tasks by the sequencer.

The loading operation can then be carried out in a simple operation maintenance procedure when the aircraft is immobilized at a gate by using the tools provided for this purpose (trivial file transfer protocol, TFTP, or other protocol offering the same procedures for acknowledging downloads to the IMA computer).

The examples described hereinabove are given to illustrate embodiments of the invention. They in no way limit the scope of the invention which is defined by the appended claims.

The invention claimed is:

1. A system for managing warnings onboard an aircraft comprising:
an airplane data acquisition module,
a failure detection module,
a warning module signaling said failures and a user interface module,
said system further comprising a module for scheduling tasks to be executed for at least one warning and at least one procedure to be executed for said warning,
said airplane data acquisition module, failure detection module, warning module, user interface module and module for scheduling being all entirely contained on-board the aircraft and aviation certified, and
said module for scheduling being parameterizable using a configuration table that can be modified by an operation maintenance procedure performed on the ground.

2. The system for managing warnings onboard an aircraft as claimed in claim 1, wherein the configuration table comprises at least, for each of the tasks, the indication of the warning and of the procedure that define the warning and at least one parameter for scheduling said task.

3. The system for managing warnings onboard an aircraft as claimed in claim 2, wherein one of the parameters for scheduling a task is an order of display priority on the user interface module.

4. The system for managing warnings onboard an aircraft as claimed in claim 1, wherein each task has an associated status variable, said variable being loggable in a parameterizable way.

5. The system for managing warnings onboard an aircraft as claimed in claim 1, which also comprises a module for converting XML files to generate the configuration table.

6. A method of managing warnings onboard an aircraft comprising:
an airplane data acquisition step,
a failure detection step,
a step of warning about said failures,
a user interface step,
said method further comprising a step for scheduling tasks to be executed for at least one warning and at least one procedure to be executed for said warning,
said airplane data acquisition step, failure detection step, warning step, user interface step and step for scheduling being all entirely performed on-board the aircraft and aviation certified, and
said scheduling being parameterizable using a configuration table that can be modified by an operation maintenance procedure performed on the ground.

7. The method of managing warnings onboard an aircraft as claimed in claim 6, wherein the scheduling step comprises a first substep for defining the order of priority of execution of the tasks and a second substep for modifying the status of the tasks based on the outputs from the airplane data acquisition step and the user interface step.

8. The system for managing warnings onboard an aircraft as claimed in claim 1 further comprising means for defining a list of tasks to be executed comprising variables selected from the group of warning, procedure, category, priority, and status and means for programming in a high-level language at least a portion of runtime logic of said tasks.

9. The system for managing warnings onboard an aircraft as claimed in claim 8 further comprising means for converting the program in high-level language into operative language and means for loading at least a portion of output from the conversion in a configuration table of said system onboard the aircraft.

10. The system for managing warnings onboard an aircraft as claimed in claim 9, wherein the means for loading is performed at a time of an aircraft operation maintenance procedure.

11. The method of managing warnings onboard an aircraft according to claim 6, comprising at least one step for defining a list of tasks to be executed comprising variables selected from the group of warning, procedure, category, priority, and status and a step for programming in a high-level language at least a portion of runtime logic of said tasks.

12. The method of managing warnings onboard an aircraft as claimed in claim 11, further comprising a step for converting the program in high-level language into operative language and a step for loading at least a portion of output from the conversion step in a configuration table of said system onboard the aircraft.

13. The method of managing warnings onboard an aircraft as claimed in claim 12, wherein the loading step is performed at a time of an aircraft operation maintenance procedure.

* * * * *

UNITED STATES PATENT AND TRADEMARK OFFICE
CERTIFICATE OF CORRECTION

PATENT NO. : 8,659,447 B2 Page 1 of 1
APPLICATION NO. : 12/553289
DATED : February 25, 2014
INVENTOR(S) : Gilles Francois et al.

It is certified that error appears in the above-identified patent and that said Letters Patent is hereby corrected as shown below:

Title Page, item (75) Inventors

Change Inventor Julia Percier's city from "Saint Sauveur" to --Cugnaux--.

Signed and Sealed this
Twenty-seventh Day of May, 2014

Michelle K. Lee
*Deputy Director of the United States Patent and Trademark Office*